US012634787B2

(12) United States Patent
Kanakaraj et al.

(10) Patent No.: US 12,634,787 B2
(45) Date of Patent: May 19, 2026

(54) METHOD AND ELECTRONIC DEVICE FOR TRAFFIC SHAPING FOR A USER EQUIPMENT IN A WIRELESS COMMUNICATION NETWORK

(71) Applicant: SAMSUNG ELECTRONICS CO., LTD., Suwon-si (KR)

(72) Inventors: Vasanth Kanakaraj, Bangalore (IN); Ajith Kumar Kuppan, Bangalore (IN); Issaac Kommineni, Bangalore (IN); Keerthi Priya P, Bangalore (IN); Vishal Murgai, Bangalore (IN); Hyunwoo Jang, Suwon-si (KR); Sridharan Natarajan, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 657 days.

(21) Appl. No.: 17/956,349

(22) Filed: Sep. 29, 2022

(65) Prior Publication Data

US 2023/0100136 A1 Mar. 30, 2023

Related U.S. Application Data

(63) Continuation of application No. PCT/KR2022/014092, filed on Sep. 21, 2022.

(30) Foreign Application Priority Data

Sep. 30, 2021 (IN) ............................. 202141044466
Aug. 30, 2022 (IN) ............................. 202141044466

(51) Int. Cl.
*H04W 36/22* (2009.01)
*H04W 28/02* (2009.01)

(52) U.S. Cl.
CPC ........ *H04W 36/22* (2013.01); *H04W 28/0289* (2013.01)

(58) Field of Classification Search
CPC ............. H04W 36/22; H04W 28/0289; H04W 28/0226; H04W 28/0284; H04W 28/12;
(Continued)

(56) References Cited

U.S. PATENT DOCUMENTS 7,693,052 B2  4/2010 Jin et al.
2010/0267387 A1  10/2010 Stephens
(Continued)

FOREIGN PATENT DOCUMENTS

CN  103038651  4/2013
CN  109389850  2/2019
(Continued)

OTHER PUBLICATIONS

Indian Office Action issued Sep. 6, 2023 in corresponding Indian Patent Application No. 202141021585.
(Continued)

*Primary Examiner* — Ricky Q Ngo
*Assistant Examiner* — Meheret Woldegebreal Kidane
(74) *Attorney, Agent, or Firm* — NIXON & VANDERHYE P.C.

(57) ABSTRACT

The present disclosure discloses a method and system for traffic shaping for a user equipment (UE) in a wireless communication network. The method comprises: estimating a congestion at each of a plurality of cells in the wireless communication network based on one or more network key performance indicators (KPIs) associated with the wireless communication network, collecting movement data of the UE by monitoring a movement of the UE connected to a first cell, predicting, based on the movement data and at least one of the estimated congestion and a bandwidth delay product
(Continued)

(BDP) of the each of the plurality of cells, whether the UE is likely to be handed over from the first cell to a second cell, and transmitting a congestion notification to a core network of the wireless communication network based on the prediction, to perform traffic shaping for the UE upon receiving the congestion notification.

17 Claims, 5 Drawing Sheets

(58) Field of Classification Search
    CPC ............ H04W 36/00837; H04W 36/32; H04L 41/5009; H04L 41/16; H04L 47/22; G06N 20/00
    USPC ........................................................ 370/329
    See application file for complete search history.

(56) References Cited

U.S. PATENT DOCUMENTS

| | | | |
|---|---|---|---|
| 2015/0098325 A1* | 4/2015 | Lu ..................... | H04W 36/0058 370/230 |
| 2015/0126193 A1 | 5/2015 | Huang et al. | |
| 2015/0172983 A1 | 6/2015 | Randriamasy et al. | |
| 2017/0311208 A1* | 10/2017 | Yu ................... | H04W 36/00692 |
| 2018/0115927 A1* | 4/2018 | Vesterinen ........ | H04W 36/0072 |
| 2019/0051155 A1 | 2/2019 | Yamaguchi | |
| 2019/0387426 A1* | 12/2019 | Lee ................... | H04W 28/0284 |
| 2020/0154459 A1* | 5/2020 | Mukherjee .......... | H04W 72/535 |
| 2020/0178137 A1 | 6/2020 | Hassan Hussein et al. | |
| 2020/0344641 A1 | 10/2020 | Veggalam et al. | |
| 2021/0092068 A1 | 3/2021 | Ismailsheriff et al. | |
| 2021/0297891 A1 | 9/2021 | Berzin et al. | |
| 2022/0408334 A1* | 12/2022 | Mehta ................... | G06N 20/00 |

FOREIGN PATENT DOCUMENTS

| | | |
|---|---|---|
| EP | 3836496 | 6/2021 |
| WO | 2016/100890 | 6/2016 |
| WO | 2020/254859 | 12/2020 |

OTHER PUBLICATIONS

Extended European Search Report dated Jul. 17, 2024 issued in European Patent Application No. 22876744.8.
Alisawi, "Congestion Recognition in Mobile Networks", May 15, 2015, 62 pages.
3GPP TR 23.705,"3rd Generation Partnership Project Technical Specification Group Services and System Aspects; Study on system enhancements for user plane congestion management", Release 13, Dec. 9, 2014, 61 pages.
Fanni, "A Cross-Layer Based Handover for TCP Applications", Apr. 1, 2007, 5 pages.
Search Report and Written Opinion dated Dec. 28, 2022 issued in International Patent Application No. PCT/KR2022/014092.
Fanni et al., "A Cross-Layer based handover for TCP applications", May 29, 2007, 7 pages.
Leong et al., "Challenges on the Way of Implementing TCP Over 5G Networks", Sep. 24, 2020, 15 pages.
Poorzare et al., "CP Congestion Control Beyond Bandwidth-Delay Product for Mobile Cellular Networks", Nov. 28, 2017, 25 pages.
European Communication pursuant to Article 94(3) EPC dated Dec. 16, 2025 for corresponding European application 22 876 744.8-1206.

* cited by examiner

METHOD AND ELECTRONIC DEVICE FOR TRAFFIC SHAPING FOR A USER EQUIPMENT IN A WIRELESS COMMUNICATION NETWORK

CROSS REFERENCE TO RELATED APPLICATIONS

This application is a continuation of International Application No. PCT/KR2022/014092 designating the United States, filed on Sep. 21, 2022, in the Korean Intellectual Property Receiving Office and claiming priority to Indian Provisional Patent Application Serial No. 202141044466 (PS), filed on Sep. 30, 2021, in the Indian Patent Office, and to Indian Complete Patent Application Serial No. 202141044466 (CS), filed on Aug. 30, 2022, in the Indian Patent Office, the disclosures of all of which are incorporated by reference herein in their entireties.

BACKGROUND

Field

The disclosure relates to a method and a system for traffic shaping for a user equipment (UE) in a wireless communication network.

Description of Related Art

In a wireless network, congestion occurs frequently at an access network (wireless medium and fast path). In current architecture, there is a limitation where the core network is not aware of the prevailing or impending congestion at an access network. Mobile handovers between high and low congested cells in heterogeneous network open a multitude of challenges in transport layer protocols such as transmission control protocol (TCP) and QUIC. User mobility between cells with higher variance in bandwidth delay product (BDP) results in sudden BDP changes. Some of the high BDP to low BDP scenarios are mobile handovers happening between cells with different wireless capability such as 5G sub-6 ghz, 5G mmwave, 4G, Mobile Edge Computing (MEC) capable cell and non-MEC cell. User mobility between cells with large BDP difference in heterogeneous network provides an operator with challenges in delivering seamless data experience to end user.

The inability of existing congestion control mechanisms in TCP & QUIC to adjust to sudden changes in BDP results in packet queueing delays, packet drops leading to degraded user experience.

Hence, there is a need to provide techniques which overcome the above discussed problems.

SUMMARY

Various example embodiments of the disclosure provide a method for traffic shaping for a user equipment (UE) in a wireless communication network. The method comprises: estimating a congestion at each of a plurality of cells in the wireless communication network based on one or more network key performance indicators (KPIs) associated with the wireless communication network, collecting movement data of the UE by monitoring a movement of the UE connected to a first cell, predicting, based on the movement data and at least one of the estimated congestion and a bandwidth delay product (BDP) of the each of the plurality of cells, whether the UE is likely to be handed over from the first cell to a second cell, where a congestion in the first cell is lower than a congestion in the second cell and/or a difference between a BDP of the first cell and a BDP of the second cell is greater than a specified threshold, and transmitting a congestion notification to a core network of the wireless communication network based on the prediction, to perform traffic shaping for the UE upon receiving the congestion notification.

According to an example embodiment, an electronic device for traffic shaping for a user equipment (UE) in a wireless communication network, is disclosed. The electronic device comprises a memory and at least one processor coupled to the memory. The at least one processor is configured to estimate a congestion at each of a plurality of cells in the wireless communication network based on one or more network key performance indicators (KPIs) associated with the wireless communication network; collect movement data of the UE by monitoring a movement of the UE connected to a first cell; predict, based on the movement data and at least one of the estimated congestion and a bandwidth delay product (BDP) of the each of the plurality of cells, whether the UE is likely to be handed over from the first cell to a second cell, where a congestion in the first cell is lower than a congestion in the second cell and/or a difference between a BDP of the first cell and a BDP of the second cell is greater than a specified threshold; and transmit a congestion notification to a core network of the wireless communication network based on the prediction, to perform traffic shaping for the UE upon receiving the congestion notification.

According to an example embodiment, a non-transitory computer readable storage medium storing instructions, is disclosed. The instructions, when executed by a processor of an electronic device, cause the electronic device to perform operations. The operations comprise estimating a congestion at each of a plurality of cells in the wireless communication network based on one or more network key performance indicators (KPIs) associated with the wireless communication network; collecting movement data of the UE by monitoring a movement of the UE connected to a first cell; predicting, based on the movement data and at least one of the estimated congestion and a bandwidth delay product (BDP) of the each of the plurality of cells, whether the UE is likely to be handed over from the first cell to a second cell, where a congestion in the first cell is lower than a congestion in the second cell or a difference between a BDP of the first cell and the BDP of the second cell is greater than a specified threshold; and transmitting a congestion notification to a core network of the wireless communication network based on the prediction, to perform traffic shaping for the UE upon receiving the congestion notification.

To further illustrate the advantages and features of the present disclosure, a more particular description will be rendered with reference to various embodiments thereof, illustrated in the appended drawings. It will be appreciated that these drawings depict example embodiments of the disclosure and are therefore not to be considered limiting its scope. The disclosure will be described and explained with additional specificity and detail with reference to the accompanying drawings.

BRIEF DESCRIPTION OF THE DRAWINGS

The above and other features, aspects, and advantages of certain embodiments of the present disclosure will be more apparent from the following detailed description, taken in conjunction with the accompanying drawings in which like reference numerals refer to like elements, and in which.

Figure 1:
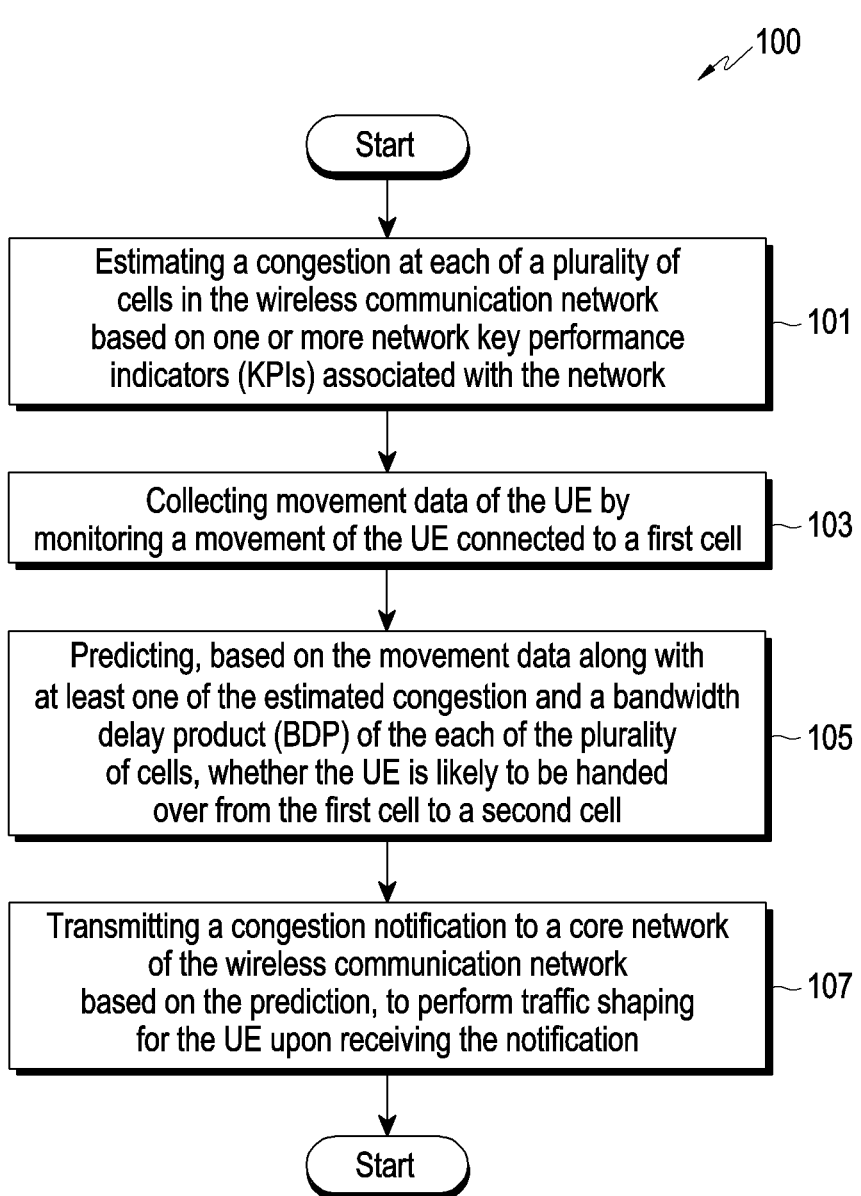
FIG. 1 is a flowchart illustrating an example method for traffic shaping for a user equipment (UE) in a wireless communication network, according to various embodiments.

Further, skilled artisans will appreciate that elements in the drawings are illustrated for simplicity and may not have been necessarily drawn to scale. For example, the flowcharts illustrate the method in terms of various operations involved to aid in understanding of aspects of the present disclosure. Furthermore, in terms of the construction of the system, one or more components of the system may have been represented in the drawings by conventional symbols, and the drawings may illustrated details that are pertinent to understanding the embodiments of the present disclosure so as not to obscure the drawings with details that will be readily apparent to those of ordinary skill in the art having benefit of the description herein.

DETAILED DESCRIPTION

It should be understood at the outset that although illustrative implementations of the example embodiments of the present disclosure are illustrated below, the present disclosure may be implemented using any number of techniques, whether currently known or in existence. The present disclosure should in no way be limited to the illustrative implementations, drawings, and techniques illustrated below, including the example design and implementation illustrated and described herein, but may be modified within the scope of the disclosure.

The term "some" as used herein may refer, for example, to "none, or one, or more than one, or all.". Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" may refer to "no embodiment, or one embodiment, or more than one embodiment, or all embodiments."

The terminology and structure employed herein is for describing, teaching, and illuminating various embodiments and their specific features and elements and does not limit, restrict, or reduce the spirit and scope of the claims or their equivalents.

For example, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having an ordinary skill in the art.

It should be noted that the term "UE" may refer, for example, and without limitation, to any electronic device used by a user such as a mobile device, a desktop, a laptop, personal digital assistant (PDA) or similar devices.

Example embodiments of the present disclosure will be described in greater detail below with reference to the accompanying drawings.

Figure 2:
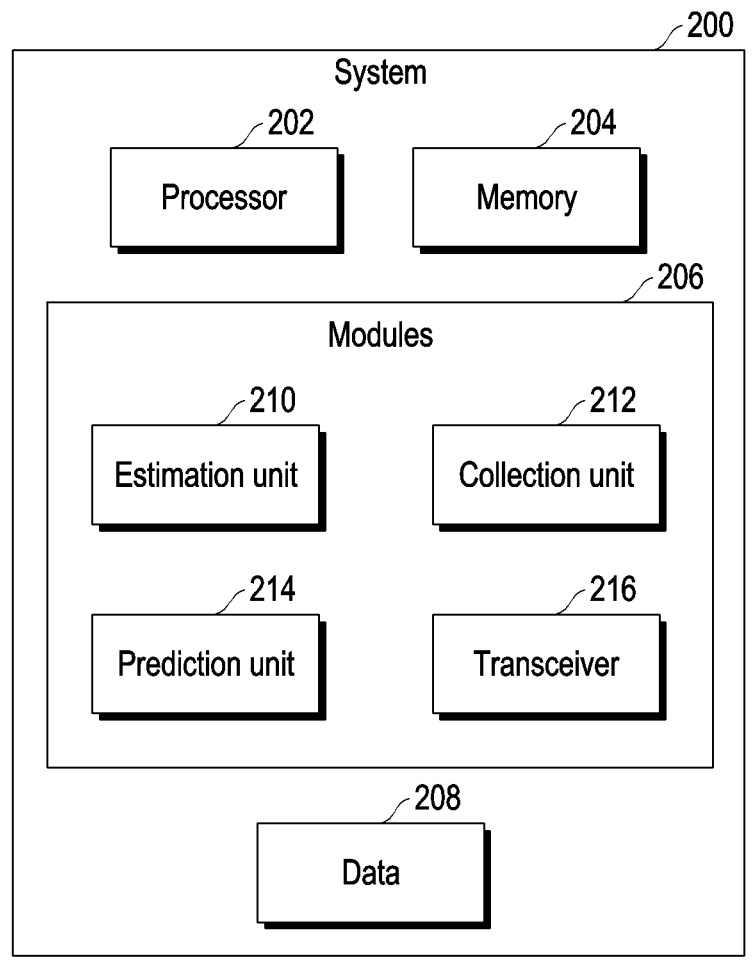
FIG. 2 is a block diagram illustrating an example configuration of a system for traffic shaping for a user equipment (UE) in a wireless communication network, according to various embodiments.
Figure 3:
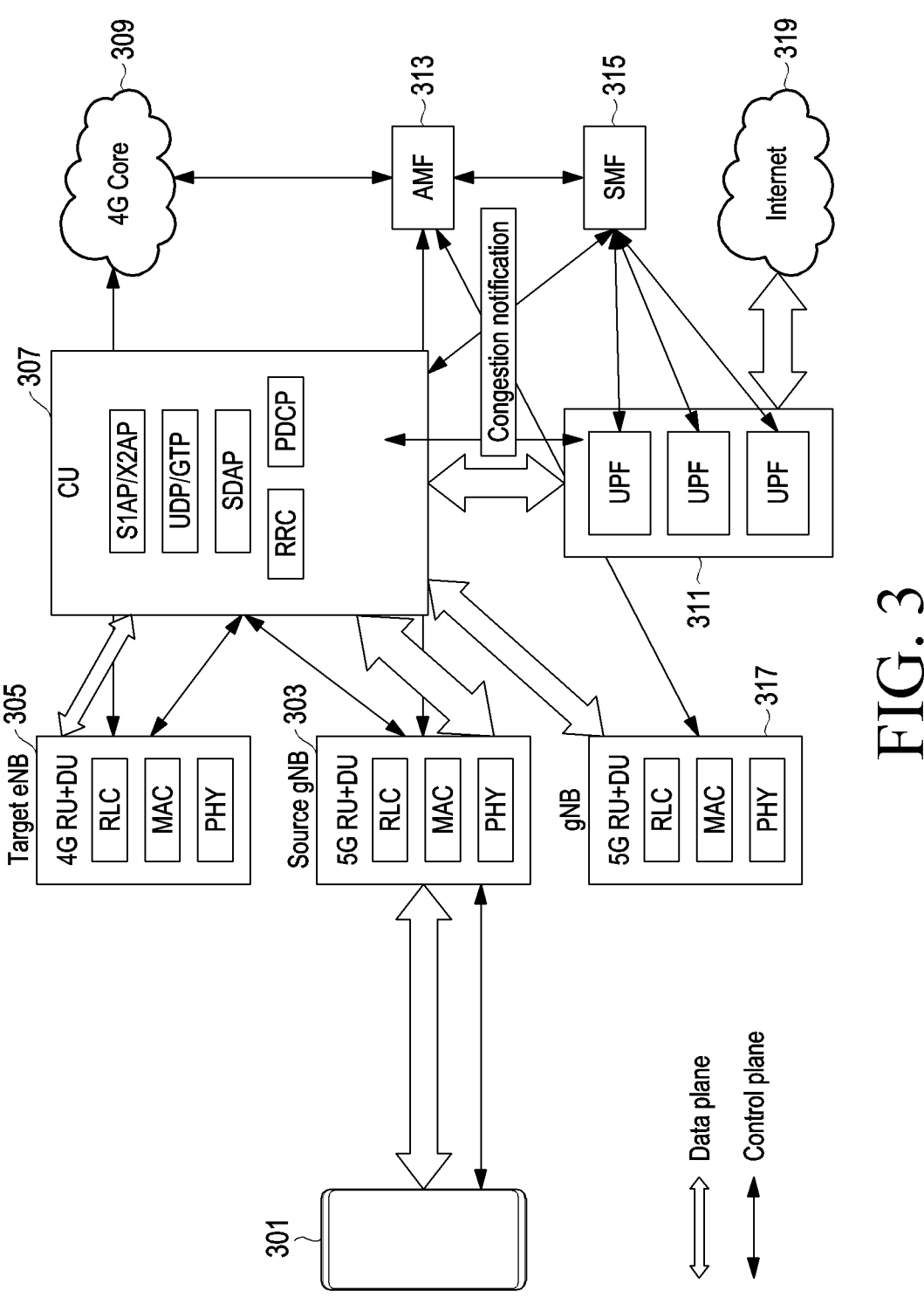
FIG. 3 is a diagram illustrating an example network architecture implementing traffic shaping for a user equipment (UE), according to various embodiments.

FIG. 1 is a flowchart illustrating an example method for traffic shaping for a user equipment (UE) in a wireless communication network, according to various embodiments. FIG. 2 is a block diagram illustrating an example configuration of a system for traffic shaping for a user equipment (UE) in a wireless communication network, according to various embodiments. FIG. 3 is a diagram illustrating an example network architecture implementing traffic shaping for a user equipment (UE), according to various embodiments. For the sake of brevity, the description of FIGS. 1, 2 and 3 are explained in conjunction with each other.

The system 200 may include, but is not limited to, a processor (e.g., including processing circuitry) 202, memory 204, modules (e.g., including various processing circuitry and/or executable program instructions) 206, and data unit 208. The units/modules 206 and the memory 204 may be coupled to the processor 202. The system 200 may be implemented as or in an electronic device.

The processor 202 may include various processing circuitry and may be a single processing unit or several units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules 206 amongst other things, include routines, programs, objects, components, data structures, etc., which perform particular tasks or implement data types. The units 206 may also be implemented as, signal processor(s), state machine(s), logic circuitries, and/or any other device or component that manipulate signals based on operational instructions.

Further, the modules 206 can be implemented in hardware, instructions executed by a processing unit, or by a combination thereof. The processing unit can comprise a computer, a processor, such as the processor 202, a state machine, a logic array, or any other suitable devices capable of processing instructions. The processing unit can be a general-purpose processor which executes instructions to cause the general-purpose processor to perform the required tasks or, the processing unit can be dedicated to performing the required functions. The modules 206 and the processor 202 may be integrally referred to as at least one processor. In an embodiment of the present disclosure, the units 206 may be machine (or computer)-readable instructions (software) which, when executed by a processor/processing unit, perform any of the described functionalities.

In an embodiment, the modules 206 may include an estimation unit 210, a collection unit 212, a prediction unit 214, and a transceiver 216.

The various modules 210, 212, 214, 216 (which may be referred to as 210-216) may be in communication with each other. In an embodiment, the various modules 210-216 may be a part of the processor 202. In an embodiment, the processor 202 may be configured to perform the functions of modules 210-216. The data unit (e.g., including a memory) 208 serves, amongst other things, as a repository for storing data processed, received, and generated by one or more of the units 206.

FIG. 3 is a diagram illustrating an example network architecture implementing traffic shaping for a user equipment (UE), according to various embodiments. As shown in FIG. 3, a user equipment (UE) 301 is connected to a first cell associated 5G network via a source node e.g., g Node B (gNB) 303. The UE is to be handed over to a second cell associated with 4G network via a target node e.g., eNB 305. As shown in FIG. 3, the target node 305 is connected to a 4G core network 309 via a centralized unit (CU) 307. Similarly, the source node 303 is connected to various functions of 5G core network, such as a user plane function (UPF) 311, an access and mobility management function (AMF) 313 and session management function (SMF) 315, via CU 307. Further, each node, e.g., the gNB 303 and eNB 305 has a radio unit (RU) and a distributed unit (DU). The centralized unit (CU) 307 manages multiple RU and DU such as RU and DU of the target eNB 305 and source gNB 303. The CU may also be connected to another gNB 317 whose RU and DU it manages. The nodes 303, 305 may also include various layers such as radio link layer (RLC), media access layer (MAC) and physical layer (PHY). The UPF 311 of the 5G core network may connect data coming from the source node 303 to Internet 319.

Referring to FIG. 1, at 101, the method 100 may include estimating a congestion at each of a plurality of cells in the wireless communication network based on one or more network key performance indicators (KPIs) associated with the network. In an embodiment, the communication network may include a plurality of cells to provide coverage area for the network. The estimation unit 210 may estimate congestion occurring at each of the plurality of cells. As known to a person skilled in the art, congestion may refer to a reduction in quality of service (QOS) that causes packet loss, queueing delay, or the blocking of new connections. In an embodiment, the estimation unit 210 may estimate the congestion using one or more key performance indicators (KPIs) associated with the network. In an embodiment, the one or more network KPIs include a number of active UEs of a source base station associated with the first cell, a number of active UEs of a target base station associated with the second cell, a capacity of the source base station, a capacity of the target base station, an average throughput of the source base station, an average throughput of the target base station, a maximum throughput of the source base station, a maximum throughput of the target base station, an average CPU and memory utilization of a radio unit (RU) and a distribution unit (DU), and average queue utilization per quality of service (QoS). In a further embodiment, the one or more network KPIs correspond to network and signalling parameters of the network entity.

At 103, the method 100 may include collecting movement data of the UE by monitoring a movement of the UE connected to a first cell. In an embodiment, the movement data may refer to location tracking data that indicates UE's location within a cell. As shown in FIG. 3, the UE 301 is connected to a source node 303 which may be considered as the first cell. Accordingly, the collecting unit 212 may monitor movement of the UE 301 and collect movement data of the UE based on the monitored movement of the UE 301. In an embodiment, the collecting unit 212 may monitor the movement of the UE 301 using techniques known to one skilled in the art. Further, in an embodiment, the collecting unit 212 may keep monitoring the UE (301) movement within the current cell, e.g., the first cell. Hence, the collecting unit 212 keeps track of UE location in current cell. When the UE is handed over to adjacent cell such as second cell, due to user movement, then the new cell, e.g., the second cell becomes the current cell.

At 105, the method 100 may include predicting, based on the movement data along with at least one of the estimated congestion and a bandwidth delay product (BDP) of the each of the plurality of cells, whether the UE is likely to be handed over from the first cell to a second cell, where the congestion in the first cell is lower than the congestion in the second cell and/or a difference between the BDP of the first cell and the second cell is greater than a predetermined (e.g., specified) threshold. In other words, the prediction unit 214 may predict whether the UE 301 is likely to be handover form the first cell associated with the source node 303 to a second cell associated with the target node 305. The prediction unit 214 may predict this handover based on movement data along with at least one of the estimated congestion and a bandwidth delay product (BDP) of the each of the plurality of cells. For example, if the movement data of the UE 301 indicates the UE 301 usually moves from the source node 303 to the target node 305, then the prediction unit 214 may predict that the UE is likely to be moved from the first cell to the second cell. In an embodiment, the prediction unit 214 may predict whether the UE is likely to be handed over from the first cell to the second cell based on at least one of a plurality of signalling parameters associate with the UE, wherein the plurality of signalling parameters corresponds to signal condition of the UE. For example, if signal strength of the second cell associated with the target node 305 is higher than the signal strength of the first cell associated with the source node 303, then the prediction unit 214 may predict that the UE 301 is likely to be handed over from the first cell to the second cell based on a historical data. Further, to predict if the congestion in the first cell is lower than the congestion in the second cell, the prediction unit 214 may compare the congestion estimated at the target node 305 with the congestion estimated at the source node 303. In an embodiment, the prediction unit 214 may receive an estimated neighbouring congestion from a plurality of neighbour cells in the wireless communication network and predict whether the UE is likely to be handed over from the first cell to the second cell based on the movement data, wherein the second cell is from the plurality of neighbour cells. For example, if the target node 305 comprises of plurality of cells, then the prediction unit 214 may receive the movement data from the collecting unit 212 and based on the movement data, it may predict that the UE is likely to be handed over to the second cell. The prediction unit may receive estimated neighbouring congestion/BDP from each of the cell associated with the target node 305 and compare the estimated congestion/BDP of each of these cells with the estimated congestion/BDP of the first cell. Based on the comparison, the prediction unit 214 may predict if the estimated congestion/BDP in the second cell is higher than the estimated congestion/BDP in the first cell.

In an embodiment, the prediction unit 214 may also determine if a difference between the BDP of the first cell and the second cell is greater than a predetermined threshold. For example, the prediction unit may compare BDP of the first cell associated with the source node 303 with the BDP of the second cell associated with the target node 305 and if the difference between the BDP of both the cells is above a predetermined threshold, then it may be predicted that the congestion at the second cell is more than the congestion at the first cell. It should be noted that the predetermined threshold may be configured and may be configurable by the source network.

In an embodiment, the prediction unit 214 may predict whether the UE is likely to be handed over from the first cell to the second cell is predicted using a machine learning model.

Referring back to FIG. 1, at 107, the method 100 may include transmitting a congestion notification to a core network of the wireless communication network based on the prediction, to perform traffic shaping for the UE upon receiving the notification. In another words, the transceiver 216 may transmit the congestion notification to the UPF 311 if the prediction unit 214 predicts that the UE 301 is likely to be handed over from the first cell to a second cell and the congestion in the first cell is lower than the congestion in the second cell and/or a difference between the BDP of the first cell and the second cell is greater than a predetermined threshold. In an embodiment, the congestion notification indicates at least one of the congestion in the first cell being lower than the congestion in the second cell and the difference between the BDP of the first cell and the second cell being greater than the predetermined threshold.

Further, upon receiving the congestion notification, the core network such as the UPF, may perform traffic shaping of buffers to proactively adapt congestion control (CC) methods in the UE or internet server to forthcoming event. This enables data delivery to end user with minimal impact (avoids hung data session, buffering etc). For example, the CC method of TCP, QUIC may react to traffic shaping event from core network and may regulate the amount of data being sent into network. Hence when UE gets handed over to low BDP cell, the UE's applications would have already adjusted their data rate to match target cell capability. Packet losses are mitigated as CC in end points are notified in advance about the forthcoming congestion event. Core network enables efficient packet transmission leading to faster flow completion time (FCT) and better throughput, as shown in FIGS. 4A and 4B.

Figure 4A:
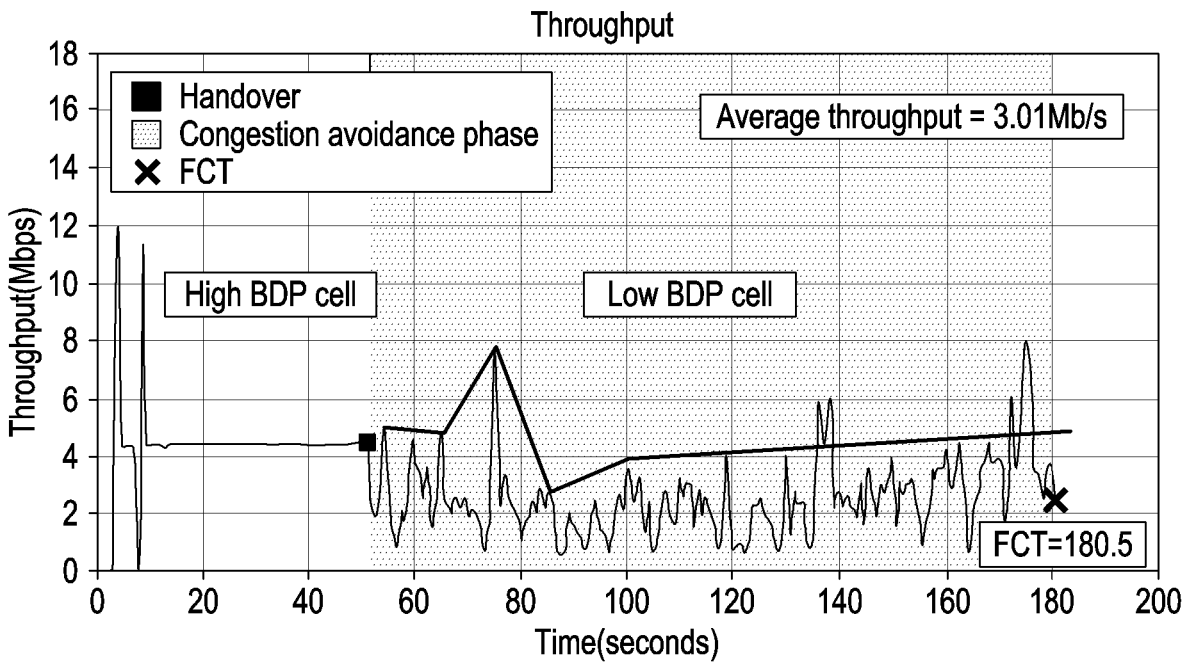
FIG. 4A is a graph illustrating throughput of the UE when there is handover from a high BDP cell to a low BDP cell, according to existing art.
Figure 4B:
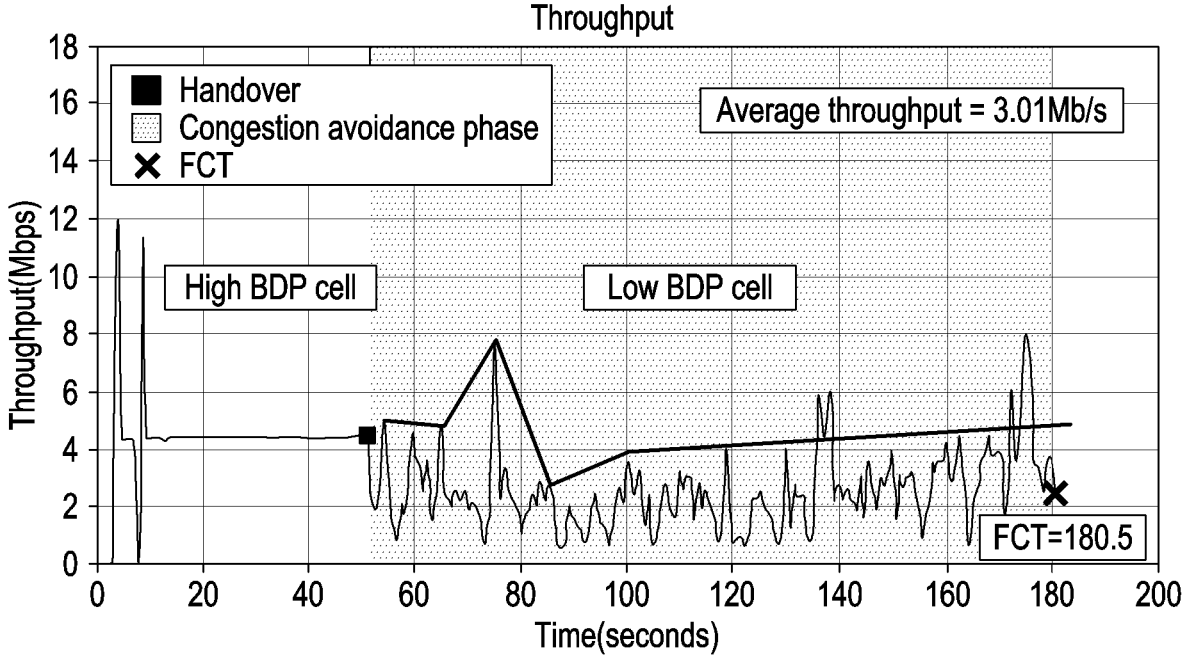
FIG. 4B is a graph illustrating throughput of the UE when there is handover from a high BDP cell to a low BDP cell, according to various embodiments.

FIG. 4A is a graph illustrating throughput of the UE when there is handover from a high BDP cell to a low BDP cell, in accordance with the conventional art. FIG. 4B is a graph illustrating throughput of the UE when there is handover from a high BDP cell to a low BDP cell, according to various embodiments. As can be seen in FIGS. 4A and 4B, the throughput of the UE is increased if the handover of the UE is performed based on the estimated congestion according to the various embodiments.

Figure 5:
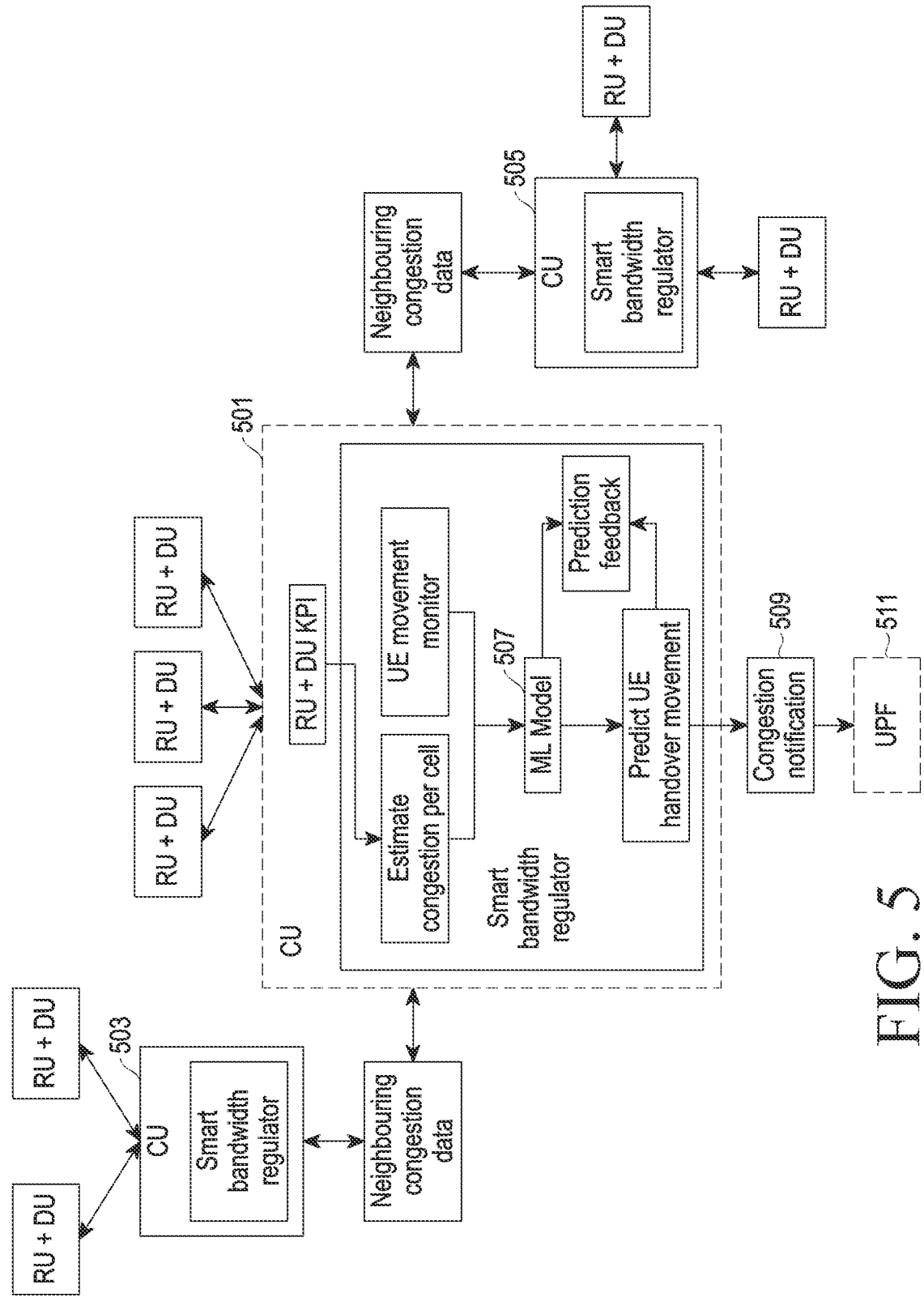
FIG. 5 is a diagram illustrating an example implementation of the system for traffic shaping for a user equipment (UE) in a wireless communication network, according to various embodiments.

In an embodiment, the system 200 may be implemented in the CU 307 associated with the source node 303. FIG. 5 is a diagram illustrating an example implementation of the system 200, according to various embodiments. As shown in FIG. 5, the CU 501 associated with the source node 303 manages multiple RU and DU. The CU 501 may estimate congestion at a first cell of the source node and may monitor the movement of the UE. The CU 501 may estimate the congestion at the first cell based on one or more KPIs which are already collated at CU 501. The CU 501 may also predict if the UE is to be handed over from a first cell connected to the UE to a second cell. The second cell may be connected to a source node 303 associated with the first cell. In an embodiment, the second cell may be a neighbour cell associated with a target node 305. Accordingly, the CU 501 may predict if the second cell has higher congestion compared to the first cell based on estimated congestion of cells at the source node 303 and the target node 305. In an embodiment, the CU 501 may receive estimated congestion of cells at the target node from neighbouring CUs 503, 505 associated with the neighbouring cell. Hence, the estimated congestion may be shared among multiple CUs. If the prediction is done using a machine learning (ML) model 507, then the prediction feedback is provided to the ML model 507 so that the model 507 may learn from the feedback. Thereafter, the CU 501 transmits a congestion notification 509 to a UPF 511. Accordingly, the UPF 511 may perform traffic shaping. In an embodiment, the system 200 may be referred as a smart bandwidth regulator, as shown in FIG. 5.

Hence, the disclosed techniques provide various advantages including, for example, and without limitation:

a framework to identify scenarios for proactive bandwidth regulation, where a user might move between 5G and 4G cells, 5G mmwave to 5G sub 6 Ghz, Multi-access Edge Computing (MEC) to non-MEC or cells with larger BDP variance.

Due to access network providing a congestion notification to core network, a proactive bandwidth regulation can be performed in advance to match the bandwidth capability of target node.

Such proactive bandwidth throttling may reduce chances for hung data session/buffering/sudden loss in quality of data connection.

Reduction in packet loss as CC enters congestion avoidance phase due to proactive traffic shaping by User Plane Function (UPF)

Improvement in UE throughput for TCP, QUIC flows as CC mitigates slow start phase.

Reduction in Flow Completion Time (FCT) due to proactive congestion mitigation

Proactive congestion notification provided by network is treated as congestion event by the applications and take necessary actions to adapt.

a framework to share congestion event in access network with core network.

While specific language has been used to describe the disclosure, any limitations arising on account of the same are not intended. As would be apparent to one skilled in the art, various working modifications may be made to the method in order to implement the concept as taught herein.

The drawings and the forgoing description give examples of embodiments. Those skilled in the art will appreciate that one or more of the described elements may well be combined into a single functional element. Certain elements may be split into multiple functional elements. Elements from one embodiment may be added to an embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the disclosure or not, such as differences in structure, dimension, and use of material, are possible. The scope of embodiments is at least as broad as given by the following claims.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an electronic device for traffic shaping for a user equipment (UE) in a wireless communication network, the method comprising:
estimating a congestion at each of a plurality of cells in the wireless communication network based on one or more network key performance indicators (KPIs) associated with the wireless communication network;
collecting movement data of the UE by monitoring a movement of the UE connected to a first cell;
predicting, based on the movement data and at least one of the estimated congestion and a bandwidth delay product (BDP) of the each of the plurality of cells, whether the UE is likely to be handed over from the first cell to a second cell, where a congestion in the first cell is lower than a congestion in the second cell and/or a difference between a BDP of the first cell and a BDP of the second cell is greater than a specified threshold; and
transmitting a congestion notification to a core network of the wireless communication network based on the prediction, to perform traffic shaping for the UE upon receiving the congestion notification, wherein the congestion notification indicates at least one of the congestion in the first cell being lower than the congestion in the second cell and the difference between the BDP of the first cell and the BDP of the second cell being greater than the specified threshold.

2. The method of claim 1, wherein the one or more network KPIs include a number of active UEs of a source base station associated with the first cell, a number of active UEs of a target base station associated with the second cell, a capacity of the source base station, a capacity of the target base station, an average throughput of the source base station, an average throughput of the target base station, a maximum throughput of the source base station, a maximum throughput of the target base station, an average CPU and memory utilization of a radio unit (RU) and a distribution unit (DU), and average queue utilization per quality of service (QoS).

3. The method of claim 1, wherein the one or more network KPIs correspond to network and signalling parameters of a network entity.

4. The method of claim 1, wherein whether the UE is likely to be handed over from the first cell to the second cell is predicted based on at least one of a plurality of signalling parameters associated with the UE, and
wherein the plurality of signalling parameters correspond to a signal condition of the UE.

5. The method of claim 1, wherein predicting whether the UE is likely to be handed over from the first cell to the second cell, comprises:
receiving an estimated neighbouring congestion from a plurality of neighbour cells in the wireless communication network; and
predicting whether the UE is likely to be handed over from the first cell to the second cell based on the received estimated neighbouring congestion, wherein the second cell is one of the plurality of neighbour cells.

6. The method of claim 1, wherein whether the UE is likely to be handed over from the first cell to the second cell is predicted using a machine learning model.

7. An electronic device for traffic shaping for a user equipment (UE) in a wireless communication network, the electronic device comprising:
memory storing instructions; and
at least one processor comprising processor circuitry coupled to the memory, wherein the instructions, when executed by the at least one processor, individually and/or collectively, cause the electronic device to:
estimate a congestion at each of a plurality of cells in the wireless communication network based on one or more network key performance indicators (KPIs) associated with the wireless communication network;
collect movement data of the UE by monitoring a movement of the UE connected to a first cell;
predict, based on the movement data and at least one of the estimated congestion and a bandwidth delay product (BDP) of the each of the plurality of cells, whether the UE is likely to be handed over from the first cell to a second cell, where a congestion in the first cell is lower than a congestion in the second cell and/or a difference between a BDP of the first cell and a BDP of the second cell is greater than a specified threshold; and
transmit a congestion notification to a core network of the wireless communication network based on the prediction, to perform traffic shaping for the UE upon receiving the congestion notification, wherein the congestion notification indicates at least one of the congestion in the first cell being lower than the congestion in the second cell and the difference between the BDP of the first cell and the BDP of the second cell being greater than the specified threshold.

8. The electronic device of claim 7, wherein the one or more network KPIs include a number of active UEs of a source base station associated with the first cell, a number of active UEs of a target base station associated with the second cell, a capacity of the source base station, a capacity of the target base station, an average throughput of the source base station, an average throughput of the target base station, a maximum throughput of the source base station, a maximum throughput of the target base station, an average CPU and memory utilization of a radio unit (RU) and a distribution unit (DU), and average queue utilization per quality of service (QoS).

9. The electronic device of claim 7, wherein the one or more network KPIs correspond to network and signalling parameters of a network entity.

10. The electronic device of claim 7, wherein the instructions, when executed by the at least one processor, individually and/or collectively, cause the electronic device to predict whether the UE is likely to be handed over from the first cell to the second cell, based on at least one of a plurality of signalling parameters associate with the UE, and wherein the plurality of signalling parameters correspond to signal condition of the UE.

11. The electronic device of claim 7, wherein for predicting whether the UE is likely to be handed over from the first cell to the second cell, the at least one processor is configured to:

receive an estimated neighbouring congestion from a plurality of neighbour cells in the wireless communication network; and predict whether the UE is likely to be handed over from the first cell to the second cell based on the received estimated neighbouring congestion, wherein the second cell is one of the plurality of neighbour cells.

12. The electronic device of claim 7, wherein whether the UE is likely to be handed over from the first cell to the second cell is predicted using a machine learning model.

13. A non-transitory computer readable storage medium storing instructions, which, when executed by at least one processor comprising processor circuitry of an electronic device, cause the electronic device to perform operations, the operations comprising:

estimating a congestion at each of a plurality of cells in the wireless communication network based on one or more network key performance indicators (KPIs) associated with the wireless communication network;

collecting movement data of the UE by monitoring a movement of the UE connected to a first cell;

predicting, based on the movement data and at least one of the estimated congestion and a bandwidth delay product (BDP) of the each of the plurality of cells, whether the UE is likely to be handed over from the first cell to a second cell, where a congestion in the first cell is lower than a congestion in the second cell and/or a difference between a BDP of the first cell and a BDP of the second cell is greater than a specified threshold; and transmitting a congestion notification to a core network of the wireless communication network based on the prediction, to perform traffic shaping for the UE upon receiving the congestion notification, wherein the congestion notification indicates at least one of the congestion in the first cell being lower than the congestion in the second cell and the difference between the BDP of the first cell and the BDP of the second cell being greater than the specified threshold.

14. The non-transitory computer readable storage medium of claim 13, wherein the one or more network KPIs include a number of active UEs of a source base station associated with the first cell, a number of active UEs of a target base station associated with the second cell, a capacity of the source base station, a capacity of the target base station, an average throughput of the source base station, an average throughput of the target base station, a maximum throughput of the source base station, a maximum throughput of the target base station, an average CPU and memory utilization of a radio unit (RU) and a distribution unit (DU), and average queue utilization per quality of service (QoS).

15. The non-transitory computer readable storage medium of claim 13, wherein the one or more network KPIs correspond to network and signalling parameters of a network entity.

16. The non-transitory computer readable storage medium of claim 13, wherein whether the UE is likely to be handed over from the first cell to the second cell is predicted based on at least one of a plurality of signalling parameters associate with the UE, and wherein the plurality of signalling parameters correspond to a signal condition of the UE.

17. The non-transitory computer readable storage medium of claim 13, wherein predicting whether the UE is likely to be handed over from the first cell to the second cell, comprises:

receiving an estimated neighbouring congestion from a plurality of neighbour cells in the wireless communication network; and predicting whether the UE is likely to be handed over from the first cell to the second cell based on the received estimated neighbouring congestion, wherein the second cell is one of the plurality of neighbour cells.

* * * * *